United States Patent
Katagawa (10) Patent No.: US 9,955,109 B2
(45) Date of Patent: Apr. 24, 2018

(54) IMAGING APPARATUS AND CONTROL METHOD THEREOF

(71) Applicant: CANON KABUSHIKI KAISHA, Tokyo (JP)

(72) Inventor: Hiroyasu Katagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/185,187

(22) Filed: Jun. 17, 2016

(65) Prior Publication Data
US 2016/0373687 A1    Dec. 22, 2016

(30) Foreign Application Priority Data

Jun. 19, 2015 (JP) .................................. 2015-123620

(51) Int. Cl.
| | |
|---|---|
| H04N 5/222 | (2006.01) |
| H04N 5/77 | (2006.01) |
| H04N 5/14 | (2006.01) |
| G11B 27/00 | (2006.01) |
| G06K 9/00 | (2006.01) |
| H04N 5/232 | (2006.01) |

(52) U.S. Cl.
CPC ......... H04N 5/772 (2013.01); G06K 9/00812 (2013.01); G11B 27/00 (2013.01); H04N 5/144 (2013.01); H04N 5/23206 (2013.01); H04N 5/23229 (2013.01)

(58) Field of Classification Search
CPC .... H04N 5/772; H04N 5/144; H04N 5/23293; H04N 5/23216; H04N 5/23245; G11B 27/00
USPC ................... 348/333.01–333.08, 222.1, 345
See application file for complete search history.

(56) References Cited

U.S. PATENT DOCUMENTS

2009/0322895 A1* 12/2009 Miyata ................. H04N 1/2145
                                                                       348/222.1

FOREIGN PATENT DOCUMENTS

JP    2013-110562 A    6/2013

* cited by examiner

*Primary Examiner* — Yogesh Aggarwal
(74) *Attorney, Agent, or Firm* — Cowan, Liebowitz & Latman, P.C.

(57) ABSTRACT

An imaging apparatus includes: an imaging unit configured to acquire captured image data; a control unit configured, responding to a first user operation, to repeatedly execute display processing to sequentially display a predetermined number of captured image data acquired by imaging after a timing of execution of the first user operation; and a recording unit configured, responding to a second user operation executed during execution of the display processing, to record in a storage unit captured image data that have been displayed at the timing of execution of the second user operation, wherein the control unit sequentially displays the predetermined number of captured image data at a speed corresponding to a repeat count of the display processing.

13 Claims, 5 Drawing Sheets

IMAGING APPARATUS AND CONTROL METHOD THEREOF

BACKGROUND OF THE INVENTION

Field of the Invention

The present invention relates to an imaging apparatus and a control method thereof.

Description of the Related Art

As an imaging mode of an imaging apparatus, a selective imaging mode is known, which selects one captured image data from a predetermined number of captured image data (a predetermined number of still images) acquired by imaging, and records the selected captured image data. A prior art related to the selective imaging mode is disclosed, for example, in Japanese Patent Application Laid-open No. 2013-110562. In the selective imaging mode disclosed in Japanese Patent Application Laid-open No. 2013-110562, a predetermined number of captured image data are acquired by imaging (consecutive shooting) while the release button is half-depressed, and the acquired predetermined number of captured image data are temporarily stored in a temporary storage memory. Then the predetermined number of captured image data are read from the temporary storage memory in the sequence from captured image data having the earliest imaging time, and the read captured image data is displayed on the screen. If the release button is fully depressed while the predetermined number of captured image data are sequentially displayed on the screen, the captured image data being displayed on the screen at the timing of fully depressing the release button is recorded in the storage unit. The storage unit permanently stores the captured image data.

SUMMARY OF THE INVENTION

However, in the conventional selective imaging mode, in some cases it may take a long time to record the captured image data in the storage unit. Furthermore, captured image data that is different from the captured image data desired by the user may be selected as the captured image data to be recorded in the storage unit.

Figure 2:
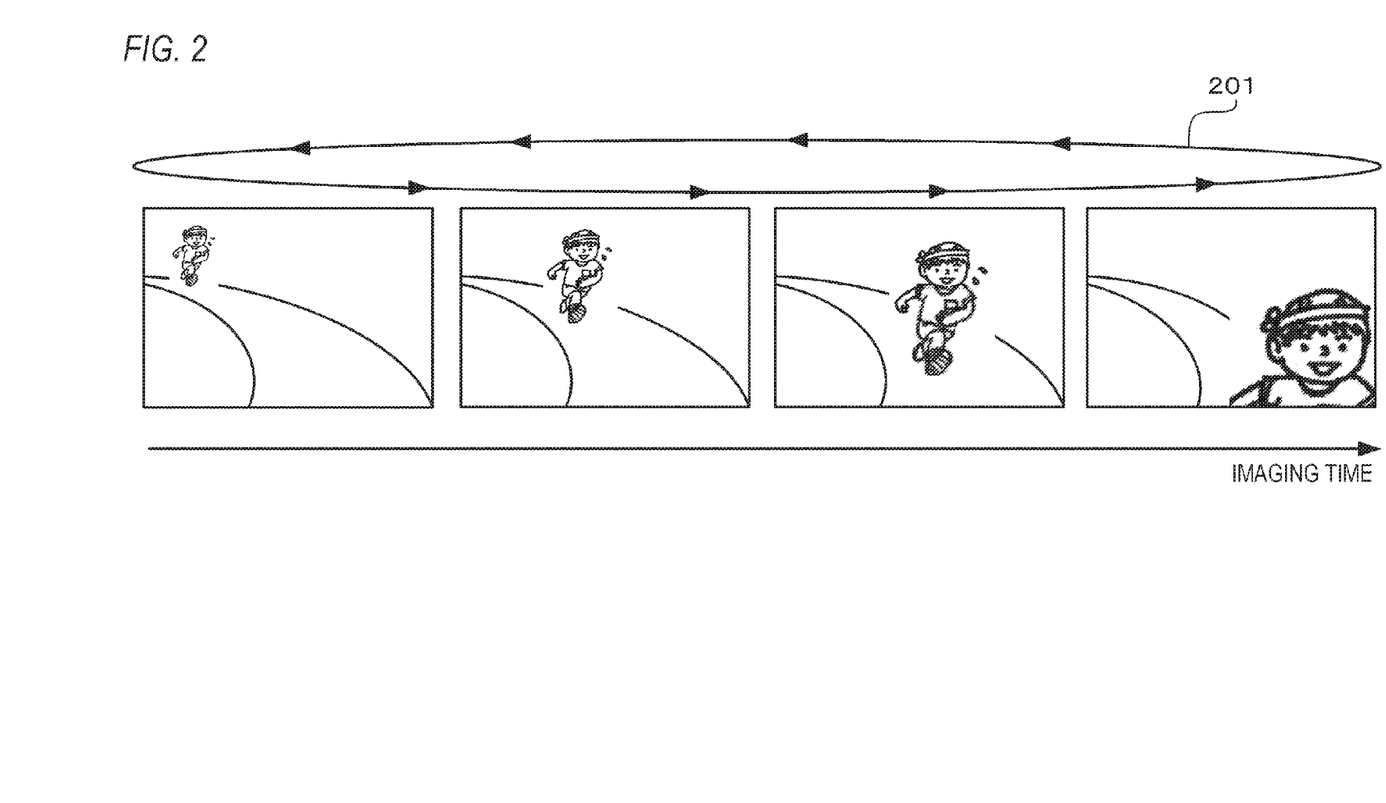
FIG. 2 shows an example of the transition of display images.

The above problem will be described in more detail with reference to FIG. 2. FIG. 2 shows an example of the transition of display images (images displayed on a screen. FIG. 2 is a case where four still images are temporarily stored in the temporary storage memory. The still image on the very left in FIG. 2 is a still image of which imaging time is the earliest among the four still images, and the still image on the very right in FIG. 2 is a still image of which imaging time is the latest among the four still images. In FIG. 2, the four still images are disposed side-by-side in the sequence of the imaging time. The arrow 201 in FIG. 2 indicates the display sequence of the still images. As shown in FIG. 2, in the selective imaging mode, the display processing to display the four still images on the screen is executed, in the sequence from the still image of which imaging time is earlier. In a case where the display processing to sequentially display the four still images completes, the display processing is performed again.

Here a case where the display time of each still image is long, that is, a case where the speed of sequentially displaying the four still images is slow, will be described. In this case, it takes a long time to display a still image desired by the user on the screen, and/or it takes a long time for the user to check all the still images (four still images). As a result, it takes a long time to record the still images in the storage unit in response to the full depression of the release button, and it takes a long time for the user to begin the next operation. The time required for displaying a desired still image (target image) selected by the user, and the time required for the user to check the four still images increases as the time to display one still image increases. In other words, the time required for displaying the still image desired by the user on the screen, and the time required for the user to check the four still images increases as the speed of sequentially displaying the four still images decreases.

Now a case where the display time of each still image is short, that is, a case where the speed of sequentially displaying the four still images is fast will be described. In this case, the still image desired by the user can be displayed on the screen quickly, or the user can check the four still images quickly. However, in this case, the display image may be switched to the next still image during the period between the display of the still image desired by the user and the full depression of the release button, and a still image that is different from the still image desired by the user may be selected and recorded. Such inappropriate recording occurs more easily as the display time of one still image is shorter, that is, as the speed of sequentially displaying the four still images is faster.

The present invention provides a technique to record the captured image data desired by the user quickly with higher certainty.

The present invention in its first aspect provides an imaging apparatus comprising:

an imaging unit configured to acquire captured image data;

a control unit configured, responding to a first user operation, to repeatedly execute display processing to sequentially display a predetermined number of captured image data acquired by imaging after a timing of execution of the first user operation on a display unit; and a recording unit configured, responding to a second user operation executed during execution of the display processing, to record in a storage unit captured image data that have been displayed on the display unit at the timing of execution of the second user operation, wherein the control unit sequentially displays the predetermined number of captured image data on the display unit at a speed corresponding to a repeat count of the display processing.

The present invention in its second aspect provides a control method for an imaging apparatus which acquires captured image data, the control method comprising:

a control step of, responding to a first user operation, repeatedly executing display processing to sequentially display a predetermined number of captured image data acquired by imaging after a timing of execution of the first user operation on a display unit; and a recording step of, responding to a second user operation executed during execution of the display processing, recording in a storage unit captured image data that have been displayed on the display unit at the timing of execution of the second user operation, wherein in the control step, the predetermined number of captured image data are sequentially displayed on the display unit at a speed corresponding to a repeat count of the display processing.

The present invention in its third aspect provides a non-transitory computer readable medium that stores a program, wherein the program causes a computer to execute a control method for an imaging apparatus which acquires captured image data, the control method comprising:

a control step of, responding to a first user operation, repeatedly executing display processing to sequentially display a predetermined number of captured image data acquired by imaging after a timing of execution of the first user operation on a display unit; and a recording step of, responding to a second user operation executed during execution of the display processing, recording in a storage unit captured image data that have been displayed on the display unit at the timing of execution of the second user operation, and in the control step, the predetermined number of captured image data are sequentially displayed on the display unit at a speed corresponding to a repeat count of the display processing.

According to the present invention, the captured image data desired by the user can be recorded quickly with higher certainty.

Further features of the present invention will become apparent from the following description of exemplary embodiments with reference to the attached drawings.

DESCRIPTION OF THE EMBODIMENTS

Figure 1:
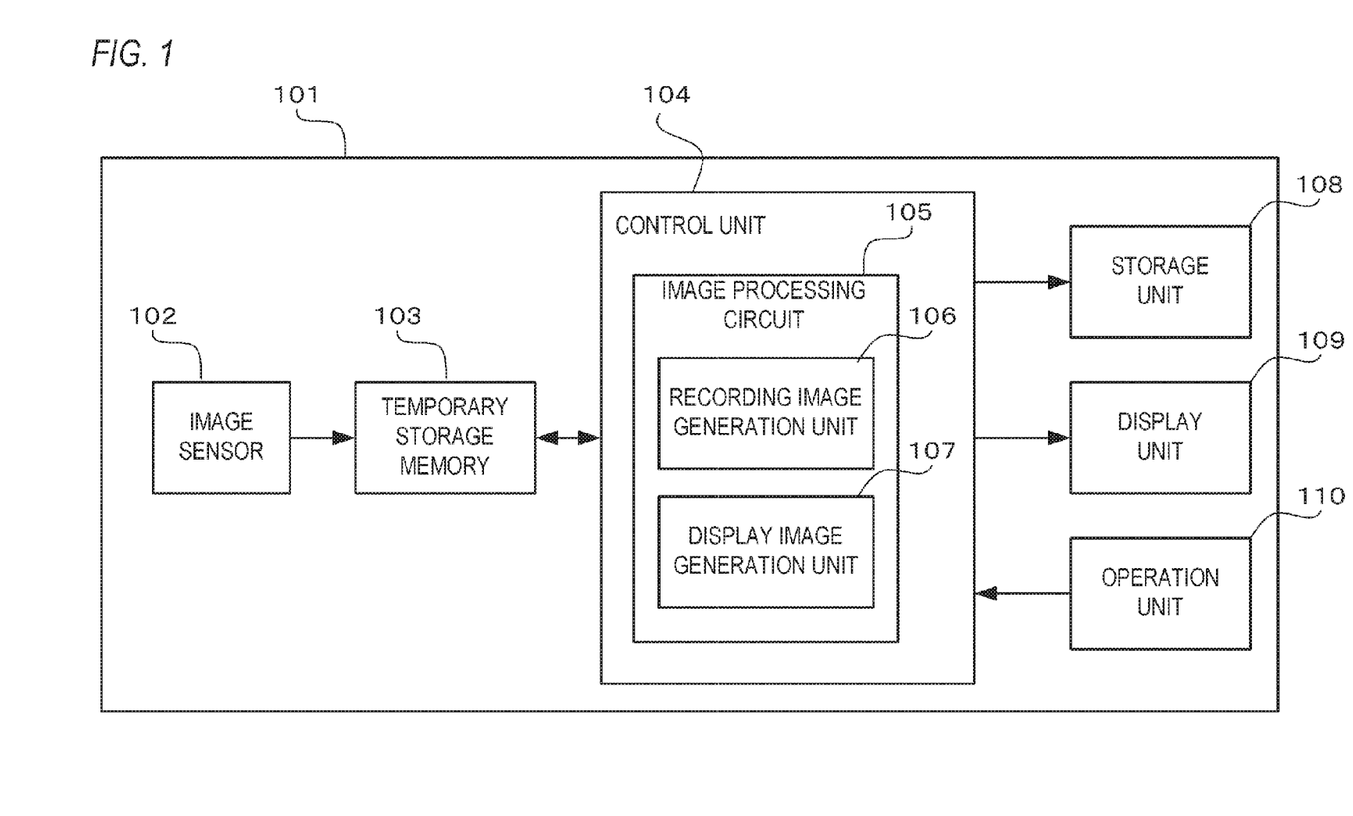
FIG. 1 is a block diagram showing an example of the general configuration of an imaging apparatus according to this embodiment.

Embodiments of the present invention will be described with reference to the drawings. FIG. 1 is a block diagram showing an example of a general configuration of an imaging apparatus 101 according to this embodiment. As shown in FIG. 1, the imaging apparatus 101 has an image sensor 102, a temporary storage memory 103, a control unit 104, a storage unit 108, a display unit 109 and an operation unit 110.

The control unit 104 systematically controls the processing of each functional unit of the imaging apparatus 101. The control unit 104 is constituted by a microprocessor, for example. The control unit 104 includes an image processing circuit 105.

The image sensor 102 acquires captured image data by imaging an object. For example, RAW image data is acquired as the captured image data. A format of the captured image data is not especially limited. For the image sensor 102, a CCD image sensor, a CMOS image sensor or the like can be used.

The temporary storage memory 103 temporarily stores the captured image data acquired by the image sensor 102. The temporary storage memory 103 has a capacity to store a plurality of captured image data (a plurality of (a plurality of frames of) still images). Captured image data having high resolution, for example, is sequentially recorded in the temporary storage memory 103 based on a first in first out (FIFO) system. The recording of captured image data in the temporary storage memory 103 is controlled by the control unit 104, for example.

The storage unit 108 permanently stores captured image data acquired by the image sensor 102. In concrete terms, the storage unit 108 permanently stores the later mentioned recording image data. For the storage unit 108, anon-volatile memory, a magnetic disk, an optical disk or the like can be used. The storage unit 108 may be embedded in the imaging apparatus 101, or may be detachable from the imaging apparatus 101. As a non-volatile memory detachable from the imaging apparatus 101, a CF card, an SD card or the like may be used. Recording and storage of captured image data (recording image data) in the storage unit 108 is controlled by the control unit 104, for example. Additional information, such as information on imaging, may be recorded in the storage unit 108.

The image processing circuit 105 performs various image processing operations. The image processing performed by the image processing circuit 105 is not especially limited. In this embodiment, the image processing circuit 105 includes a recording image generation unit 106 and a display image generation unit 107. The imaging apparatus 100 need not include the image processing circuit 105 (the recording image generation unit 106 and the display image generation unit 107).

The display image generation unit 107 reads captured image data acquired by the image sensor 102 from the temporary storage memory 103, and generates the display image data from the acquired captured image data (first generation processing). For example, the display image generation unit 107 performs image processing and compression processing, to generate the display image data, on the captured image data. In concrete terms, the display image generation unit 107 performs at least any of: format conversion processing, resolution conversion processing, gamma conversion processing, color conversion processing, brightness conversion processing, blur reduction processing, blurring processing, edge enhancement processing and the like on the captured image data. Thereby the display image data is generated. The display image generation unit 107 may generate the display image data from the recording image data which is recorded in the storage unit 108. The processing for generating the display image data is not especially limited.

The recording image generation unit 106 reads the captured image data acquired by the image sensor 102 from the temporary storage memory 103, and generates the recording image data from the acquired captured image data second generation processing). For example, the recording image generation unit 106 performs the image processing and compression processing for generating the recording image data, on the captured image data. In concrete terms, the recording image generation unit 106 performs, at least any of: format conversion processing, resolution conversion processing, gamma conversion processing, color conversion processing, brightness conversion processing, blur reduction processing, blurring processing, edge enhancement processing and the like on the captured image data. Thereby JPEG image data is generated as the recording image data, for example. The format of the recording image data is not especially limited. The processing for generating the recording image data is not especially limited either.

The display unit 109 displays an image, based on the captured image data acquired by the image sensor 102, on the screen. In concrete terms, the display unit 109 displays the image based on the display image data generated by the display image generation unit 107 on the screen. For the display unit 109, a liquid crystal display panel, an organic EL display panel, a plasma display panel or the like can be used. The display unit 109 can display the display image data stored in the temporary storage memory 103, or can display the display image data generated from the recording image data stored in the storage unit 108. Further, the display image data corresponding to the currently captured image data can be displayed in real-time on the display unit 109. In other words, the display unit 109 can be used as an electronic view finder (EVF). Moreover, the information on the imaging can be displayed on the display unit 109. The display unit 109 may be a display apparatus separate from the imaging apparatus 101.

The operation unit 110 accepts user operation. For example, the operation unit 110 includes a power switch, a command dial, a release button, a menu button, a cross keys, an OK button, a reproduction button and the like. The power switch is operated to turn the power of the imaging apparatus 101 ON/OFF. The command dial is operated for setting an imaging mode. The imaging mode includes, for example, a still image capture mode for imaging still image data (recording the still image data in the storage unit 108), and a moving image capture mode for imaging moving image data. The release button is operated for photographing (recording the image data in the storage unit 108). The menu button is operated for displaying the menu image. The cross keys are operated to select various settings. For example, the cross keys are operated for selecting an item included in the menu image. The OK button is operated for determining various selections and settings. The reproduction button is operated for displaying the image data recorded in the storage unit 108. A touch panel may be used as the operation unit 110. The buttons displayed on screen (display buttons), instead of physical buttons, may be used.

In this embodiment, a selective imaging mode can be set as an imaging mode of the imaging apparatus 101.

In the selective imaging mode, in response to a first user operation, the control unit 104 repeatedly performs the display processing to sequentially display a predetermined number of captured image data (predetermined number of still images) acquired by the imaging after the timing of execution of the first user operation, on the display unit 109. In this embodiment, the display processing is processing that displays a predetermined number of captured image data on the display unit 109 sequentially from the captured image data of which imaging time is earlier. Further, in this embodiment, the display processing is processing that sequentially displays a predetermined number of display image data generated from a predetermined captured image data on the display unit 109. In concrete terms, in response to the first user operation, the control unit 104 temporarily stores (records) a predetermined captured image data, which were acquired consecutively, in the temporary storage memory 103 (consecutive shooting). Then the control unit 104 controls the display image generation unit 107. Thereby the display image generation unit 107 sequentially reads the predetermined number of captured image data from the temporary storage memory 103, generates a display image data from the acquired captured image data, and outputs the generated display image data to the display unit 109. As a result, the predetermined number of display image data are sequentially displayed on the display unit 109.

The predetermined number of captured image data need not be a predetermined number of captured image data acquired consecutively. The predetermined number of captured image data may be a predetermined number of captured image data acquired intermittently with short time intervals. The intervals of the predetermined number of captured image data are not especially limited. The display sequence of the predetermined number of captured image data is not especially limited either. In the display processing, in general the predetermined number of captured image data are sequentially displayed at a speed slower than the speed of sequentially acquiring the predetermined number of captured image data (frame rate). This is called a "slow display".

Further, in the selective imaging mode, in response to a second user operation executed during execution of the display processing, the control unit 104 records captured image data, that is displayed on the display unit 109 at the timing of the execution of the second user operation, in the storage unit 108. In this embodiment, the control unit 104 records the recording image data (corresponding image data) generated from the captured image data, which is original data of the display image data that is displayed on the display unit 109 at the timing of the execution of the second user operation, in the storage unit 108. In concrete terms, in response to the second user operation executed during the execution of the display processing, the control unit 104 controls the recording image generation unit 106. Thereby the recording image generation unit 106 generates the corresponding image data in response to the second user operation executed during the execution of the display processing. Then the recording image generation unit 106 outputs the generated corresponding image data to the storage unit 108. As a result, the corresponding image data generated by the recording image generation unit 106 is recorded in the storage unit 108.

The recording image generation unit 106 may generate a predetermined number of recording image data from a predetermined number of captured image data. Then one of the predetermined number of recording image data may be recorded in the storage unit 108 by the control unit 104 controlling the recording image generation unit 106 in response to the second user operation. However, the processing load can be reduced if the above mentioned corresponding image data alone is generated.

In this embodiment, the first user operation is the user operation of half-depressing the release button, and the second user operation is the user operation of fully depressing the release button. The display processing is repeatedly executed during execution of the first user operation. The first user operation need not be an operation that is continuously performed. The display processing may be started in response to a momentary (instantaneous) first user operation. The first user operation and the second user operation are not limited to the above mentioned user operations. For example, the first user operation may be the user operation of depressing (touching) a first button, and the second user operation may be the user operation of depressing a second button. The first user operation may be the user operation of depressing a third button, and the second user operation may be a user operation of depressing the third button again.

Figure 3:
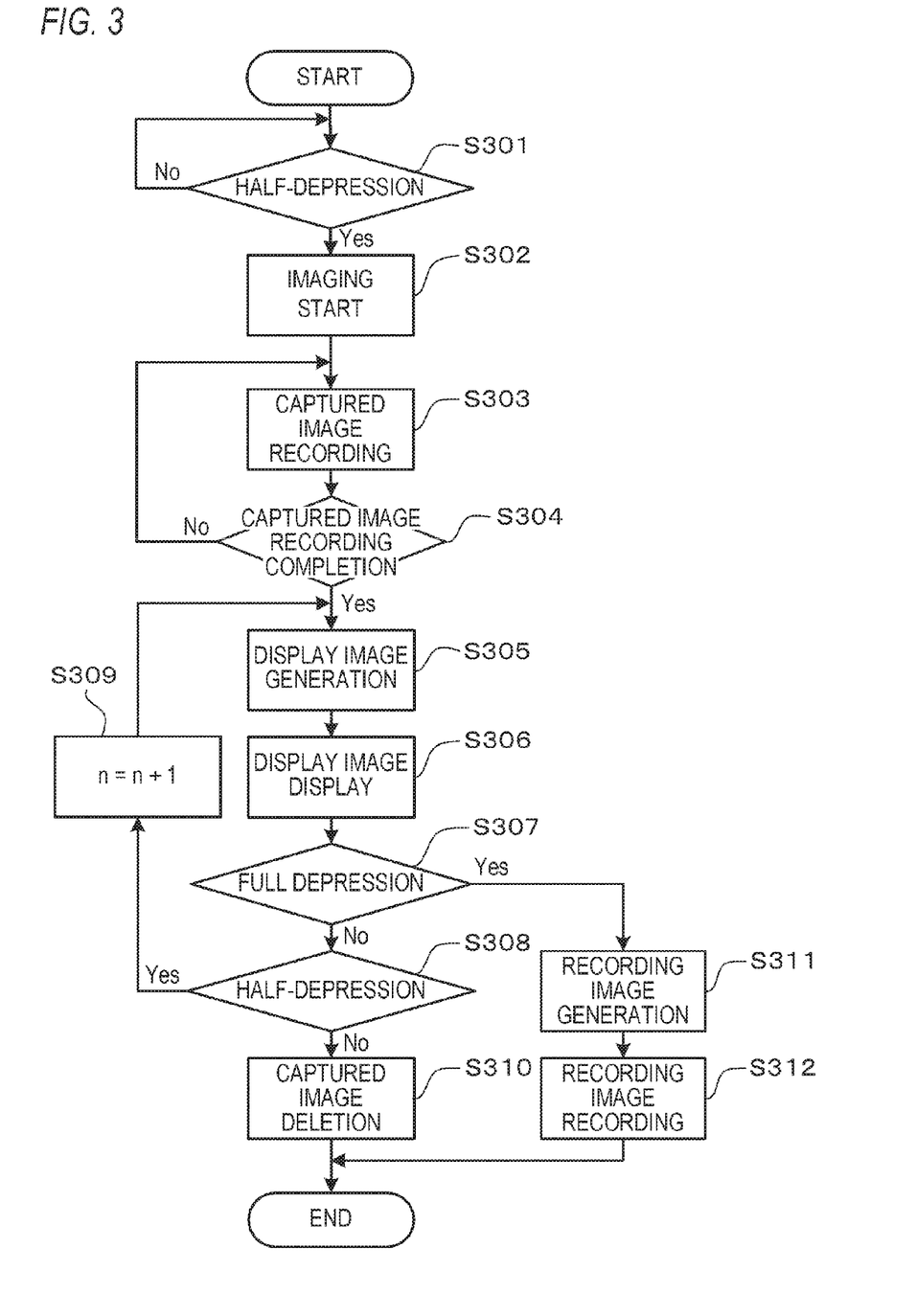
FIG. 3 is a flow chart showing an example of the processing flow of the imaging apparatus according to this embodiment.

Now an example of the processing flow of the imaging apparatus 101 will be described with reference to FIG. 3. FIG. 3 is a flow chart showing an example of the processing flow of the imaging apparatus 101. FIG. 3 shows a processing flow in a case where the selective imaging mode is set. The selective imaging mode can be set by the user operating the command dial, for example.

First the control unit 104 determines whether the depressed state of the release button is the half-depression state (S301). The processing in S301 is repeated until the release button is half-depressed, and in a case where the release button is half-depressed, processing advances to S302.

In S302, the image sensor 102 starts imaging. Then the temporary storage memory 103 stores the captured image data acquired in S302 (S303). Then the control unit 104 determines whether a predetermined number of captured image data are recorded in the temporary storage memory 103 (S304). The processing operations in S303 and S304 are repeated until a predetermined number of captured image data are recorded in the temporary storage memory 103, and in a case where the predetermined number of captured image data are recorded in the temporary storage memory 103, processing advances to S305.

In S305, the display image generation unit 107 generates a predetermined number of display image data from the predetermined number of captured image data recorded in the temporary storage memory 103. The predetermined number of display image data are sequentially generated and sequentially outputted to the display unit 109. Then the display unit 109 sequentially displays the predetermined number of display image data (S306: display processing). In this embodiment, the predetermined number of display image data are sequentially displayed on the display unit 109 at a speed corresponding to the repeat count n, which is a number of times for which the display processing has repeated up to this time. In other words, each display image data is displayed during a display time corresponding to the repeat count n. The repeat count n is counted by the control unit 104, and the above mentioned speed (above mentioned display time) is controlled by the control unit 104. In the first display processing, 0 (initial value) is used as the repeat count n. The repeat count n is initialized to 0 at a timing in a case where the release button is half-depressed, for example.

Then the control unit 104 determines whether the depressed state of the release button is the full depression state (S307). If the depressed state of the release button is not the full depression state, processing advances to S308, and if the depressed state of the release button is the full depression state, processing advances to S311. In S308, the control unit 104 determines whether the depressed state of the release button is half-depression state. If the depressed state of the release button is half-depression state, processing advances to S309, and if the depressed state of the release button is neither the full depression state nor the half depression state, processing advances to S310.

In S309, the control unit 104 adds 1 to the repeat count n in a case where one execution of display processing completes. In other words, in a case where the display of the last captured image data, out of the predetermined number of captured image data, completes, the control unit 104 adds 1 to the repeat count n. Then processing returns to S305.

In S310, the control unit 104 deletes the predetermined number of captured image data from the temporary storage memory 103. This processing flow then ends. An image (e.g. message, icon) indicating that the captured image data will be deleted may be displayed on the display unit 109, and then the predetermined number of captured image data may be deleted from the temporary storage memory 103.

In S311, the recording image generation unit 106 generates the recording image data from the captured image data, which is the original data of the display image data currently displayed. Then the recording image generation unit 106 records the recording image data generated in S311 in the storage unit 108. This flow then ends.

Figure 4:
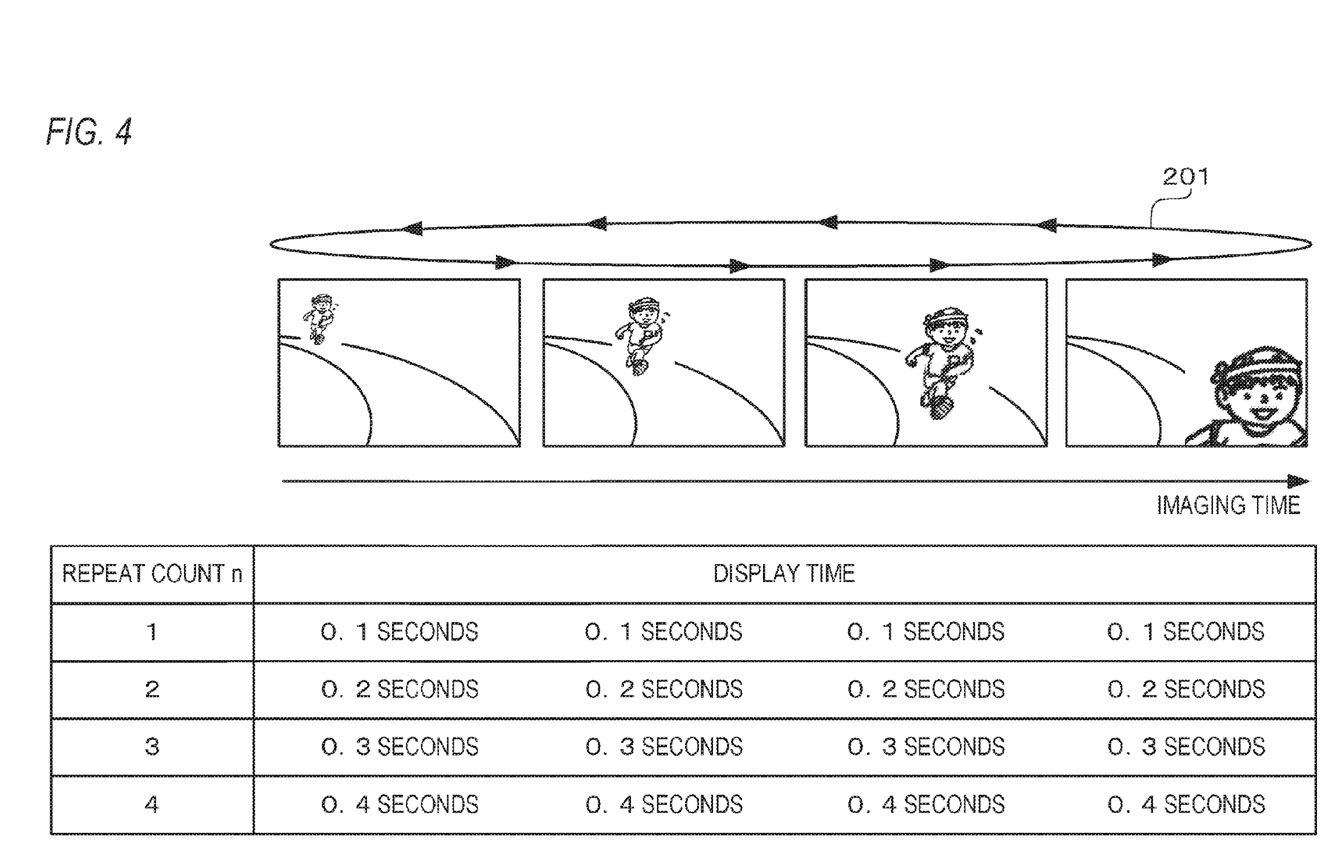
FIG. 4 shows an example of the correspondence between a repeat count and display time according to this embodiment.
Figure 5:
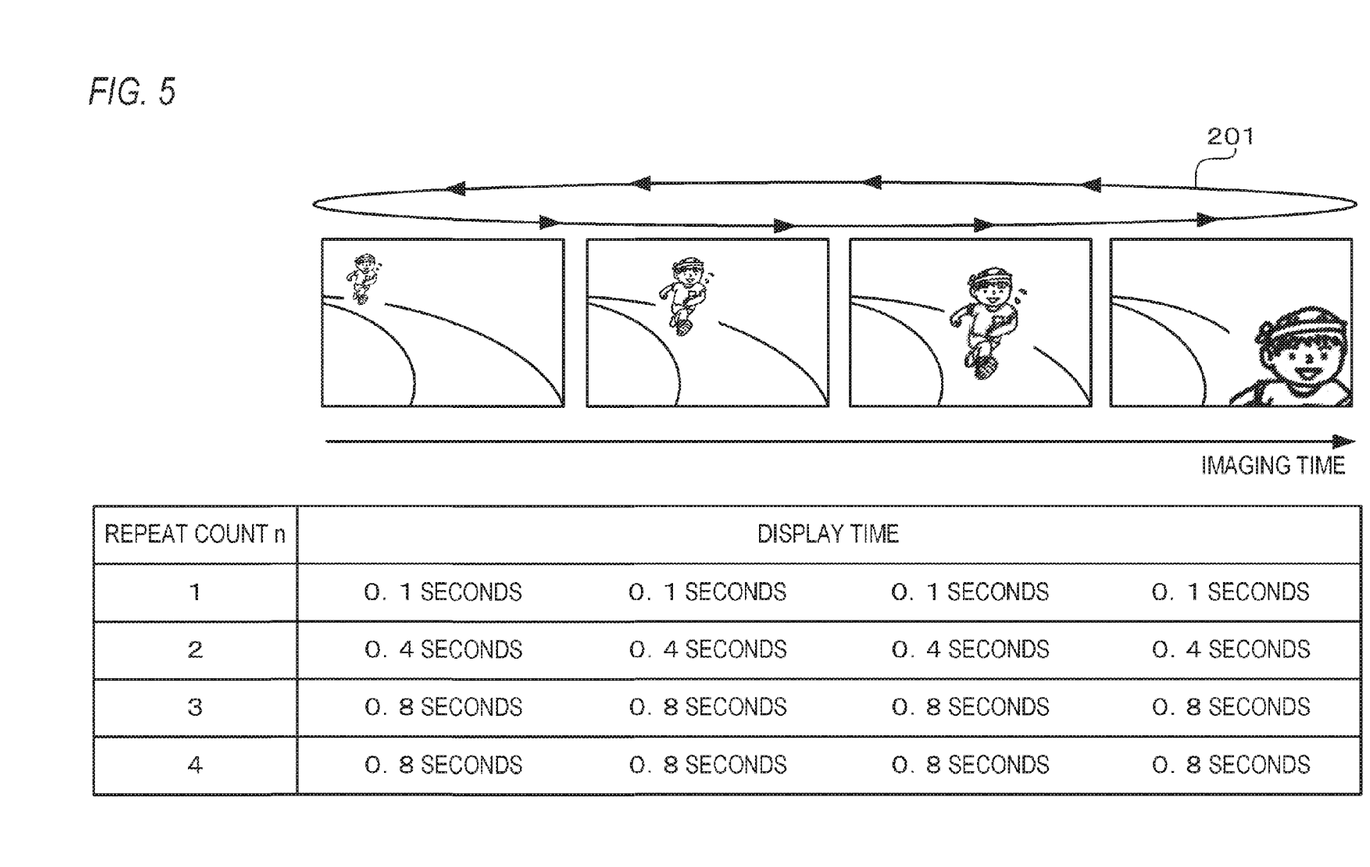
FIG. 5 shows an example of the correspondence between a repeat count and display time according to this embodiment.

FIG. 4 and FIG. 5 show examples of the correspondence between the repeat count n and the display time of each display image data (each still image). FIG. 4 and FIG. 5 also show examples of the transition of the display images (images displayed on the screen). FIG. 4 and FIG. 5 are examples a case where four still images are temporarily stored in the temporary storage memory 103. The still image disposed at the very left in FIG. 4 or FIG. 5 is a still image of which imaging time is the earliest among the four still images, and the still image disposed at the very right in FIG. 4 or FIG. 5 is a still image of which imaging time is the latest among the four still images. In FIG. 4 and FIG. 5, the four still images are disposed side-by-side in the sequence of the imaging time. The arrow 201 in FIG. 4 or FIG. 5 indicates the display sequence of the still images. As shown in FIG. 4 and FIG. 5, in the selective imaging mode, a display processing that displays four still images sequentially from the still image of which imaging time is the earliest, is performed. In a case where the display processing to sequentially display the four still images completes, the display processing is executed again. A number of still images which are sequentially displayed in the display processing may be more or less than four. The number of still images may be a predetermined fixed number, or may be a number which the user can change.

FIG. 4 is an example of continuously reducing the display speed (speed of sequentially displaying the four still images on the display unit 109) as the repeat count n increases. In other words, FIG. 4 shows an example of a case where the display time of each still image continuously increases as the repeat count n increases. In concrete terms, each still image is displayed for 0.1 seconds in the first display processing, each still image is displayed for 0.2 seconds in the second display processing, each still image is displayed for 0.3 seconds in the third display processing, and each still image is displayed for 0.4 seconds in the fourth display processing. In other words, in the Mth display processing (M is 1 or greater integer), each still image is displayed for M×0.1 seconds.

For example, in the first display processing, the user looks over the four still images, determines whether there is a still image to be recorded, and takes note of the timing in a case where the still image to be recorded is displayed. Then in the second or later display processing, the user fully depresses the release button at a timing in a case where the desired still image is displayed. Thereby the still image desired by the user is recorded in the storage unit 108. To check the four still images again, the use continues to half-depress the release button. Then the display processing is repeatedly executed, and the user can check the four still images again.

In the example in FIG. 4, a faster speed is used for the display speed in a case where the repeat count n is low, compared with the case where the repeat count n is high. Therefore the still image desired by the user can be recorded in the storage unit 108 in a shorter time than the case of always using a slow speed for the display speed. In the case of FIG. 4, the display speed is continuously reduced as the repeat count n increases. Hence switching of the display image to the next still image can be prevented during the period from display of the desired still image to the full depression of the release button. As a result, recording of a still image, which is different from the still image desired by the user, in the storage unit 108, can be prevented as well, and the still image desired by the user can be recorded in the storage unit 108 with higher certainty. In concrete terms, in a case where the display speed seems fast, the user continues to half-depress the release button. Thereby the display speed is reduced in a case where the next display processing is executed, and the user can easily full-depress the release button while the desired still image is displayed.

The display speed may be reduced in stages as the repeat count n increases. For example, each still image is displayed for 0.1 seconds in the first display processing and the second display processing, and each still image is displayed for 0.4 seconds in the third display processing and the fourth display processing.

FIG. 5 shows an example a case where the display speed, corresponding to the repeat count n, is used if the repeat count n is less than a first threshold, and a predetermined speed which does not depend on the repeat count n is used for the display speed if the repeat count n is the first threshold or more. FIG. 5 is an example of continuously reducing the display speed to a predetermined speed as the repeat count n increases in a case where the repeat count n is less than the first threshold. In concrete terms, each still image is displayed for 0.1 seconds in the first display processing, and each still image is displayed for 0.4 seconds in the second display processing. Then each still image is displayed for 0.8 seconds in the third and later display processing operations. In a case where the repeat count n is less than the first threshold, the display speed may be reduced to a predetermined speed in stages as the repeat count n increases.

To record the still image desired by the user in the storage unit 108 with higher certainty, it is preferable to use a slower display speed in a case where the movement of the object is major among the four still images, compared with the case where movement is minor. For this reason, the reduction amount of the display speed at a single time is larger in FIG. 5 than in FIG. 4. If an extremely slow speed is used as the display speed, it may take a long time to record the captured image data in the storage unit 108. Hence in FIG. 5, a lower limit value is set for the display speed, so that the captured image data can be quickly recorded in the storage unit 108. In other words, in FIG. 5, the upper limit value (0.8 seconds) is set for the display time.

As described above, according to this embodiment, a predetermined number of captured image data are sequentially displayed on the display unit at a speed corresponding to the repeat count. Thereby the captured image data desired by the user can be quickly recorded with higher certainty.

The correspondence between the repeat count n and the display speed (display time) may be a predetermined fixed relationship, or may be a relationship that the user can change. In the example described in this embodiment, the display speed is reduced as the repeat count n increases, but the correspondence between the repeat count n and the display speed is not limited to this. For example, an increase and decrease in the display speed may be repeated as the repeat count n increases. In concrete terms, a first speed is used as the display speed if the repeat count is 0 or an even number, and a second speed, which is slower than the first speed, is used as the display speed if the repeat count is an odd number.

The imaging apparatus may further include a detection unit that, based on a predetermined number of captured image data, detects the movement of the object during the imaging period of acquiring the predetermined number of captured image data. Then in a case where the magnitude of the movement detected by the detection unit is high, the control unit may use a larger reduction amount for the reduction amount of the display speed for a single time, compared with the case where the magnitude of the movement detected by the detection unit is low. For example, as a reduction amount of the display speed for a single time, the control unit may use a reduction amount that is larger as the magnitude of the movement detected by the detection unit is higher. Further, as the reduction amount of the display speed for a single time, the control unit may use a first reduction amount in a case where the magnitude of the movement detected by the detection unit is a second threshold or more. Furthermore, as the reduction amount of the display speed for a single time, the control unit may use a second reduction amount, which is smaller than the first reduction amount, in a case where the magnitude of the movement detected by the detection unit is less than the second threshold. The movement of the object and the magnitude thereof can be detected by various prior arts. For example, a movement of an object and the magnitude thereof can be detected by block matching.

The first threshold may be a predetermined fixed value or may be a value that the user can change. The second threshold may also be a predetermined fixed value or may be a value that the user can change.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-123620, filed on Jun. 19, 2015, which is hereby incorporated by reference herein in its entirety.

What is claimed is:

1. An imaging apparatus comprising:
an imaging unit configured to acquire captured image data;
a control unit configured, responding to a first user operation, to repeatedly execute display processing to sequentially display a predetermined number of captured image data acquired by imaging after a timing of execution of the first user operation on a display unit; and a recording unit configured, responding to a second user operation executed during execution of the display processing, to record in a storage unit captured image data that have been displayed on the display unit at the timing of execution of the second user operation, wherein in a case where a repeat count of the display is less than a first threshold, the control unit sequentially displays the predetermined number of captured image data on the display unit at a speed corresponding to the repeat count, and in a case where the repeat count is the first threshold or more, the control unit sequentially displays the predetermined number of captured image data on the display unit at a predetermined speed that does not depend on the repeat count.

2. The imaging apparatus according to claim 1, wherein in a case where the repeat count is less than the first threshold, the control unit reduces, continuously or in stages, the speed of sequentially displaying the predetermined number of captured image data on the display unit as the repeat count increases.

3. The imaging apparatus according to claim 1, wherein in a case where the repeat count is less than the first threshold, the control unit reduces, continuously or in stages, the speed of sequentially displaying the predetermined number of captured image data on the display unit to the predetermined speed as the repeat count increases.

4. The imaging apparatus according to claim 2, wherein in a case where a magnitude of a movement of an object in a period of imaging to acquire the predetermined number of captured image data is large, the control unit uses, as the reduction amount for a single time upon sequentially displaying the predetermined number of captured image data on the display unit, a larger reduction amount than a reduction amount in a case where the magnitude of the movement is small.

5. The imaging apparatus according to claim 4, wherein in a case where the magnitude of the movement is a second threshold or more, the control unit uses a first reduction amount as the reduction amount for a single time upon sequentially displaying the predetermined number of captured image data on the display unit, and in a case where the magnitude of the movement is less than the second threshold, the control unit uses a second reduction amount, which is smaller than the first reduction amount, as the reduction amount for a single time upon sequentially displaying the predetermined number of captured image data on the display unit.

6. The imaging apparatus according to claim 1, further comprising a count unit configured to count the repeat count.

7. The imaging apparatus according to claim 1, further comprising:
a first generation unit configured to generate display image data from the captured image data; and
a second generation unit configured to generates recording image data from the captured image data, wherein
as the display processing, the control unit performs processing to sequentially display the predetermined number of display image data, which is generated from the predetermined number of captured image data, on the display unit, and the recording unit records in the storage unit the recording image data generated from the captured image data, which is original data of the display image data that have been displayed on the display unit at the timing of execution of the second user operation.

8. The imaging apparatus according to claim 7, wherein responding to the second user operation, which is executed during the execution of the display processing, the second generation unit generates the recording image data from the captured image data, which is original data of the display image data that have been displayed on the display unit at the timing of the execution of the second user operation.

9. The imaging apparatus according to claim 1, wherein the display processing is processing that displays the predetermined number of captured image data on the display unit sequentially from captured image data of which imaging time is the earliest.

10. The imaging apparatus according to claim 1, wherein the control unit repeatedly executes the display processing during execution of the first user operation.

11. The imaging apparatus according to claim 10, wherein the first user operation is a user operation of half-depressing a release button, and
the second user operation is a user operation of fully depressing the release button.

12. A control method for an imaging apparatus which acquires captured image data, the control method comprising:
a control step of, responding to a first user operation, repeatedly executing display processing to sequentially display a predetermined number of captured image data acquired by imaging after a timing of execution of the first user operation on a display unit; and a recording step of, responding to a second user operation executed during execution of the display processing, recording in a storage unit captured image data that have been displayed on the display unit at the timing of execution of the second user operation, wherein in a case where a repeat count of the display is less than a first threshold, in the control step, the predetermined number of captured image data are sequentially displayed on the display unit at a speed corresponding to the repeat count, and in a case where the repeat count is the first threshold or more, in the control step, the predetermined number of captured image data are sequentially displayed on the display unit at a predetermined speed that does not depend on the repeat count.

13. A non-transitory computer readable medium that stores a program, wherein
the program causes a computer to execute a control method for an imaging apparatus which acquires captured image data,
the control method comprising:
a control step of, responding to a first user operation, repeatedly executing display processing to sequentially display a predetermined number of captured image data acquired by imaging after a timing of execution of the first user operation on a display unit; and a recording step of, responding to a second user operation executed during execution of the display processing, recording in a storage unit captured image data that have been displayed on the display unit at the timing of execution of the second user operation, and in a case where a repeat count of the display is less than a first threshold, in the control step, the predetermined number of captured image data are sequentially displayed on the display unit at a speed corresponding to the repeat count, and in a case where the repeat count is the first threshold or more, in the control step, the predetermined number of captured image data are sequentially displayed on the display unit at a predetermined speed that does not depend on the repeat count.

\* \* \* \* \*